(12) United States Patent
Choi et al.

(10) Patent No.: US 9,376,554 B2
(45) Date of Patent: Jun. 28, 2016

(54) RUBBER COMPOSITION FOR TIRE TREAD AND TIRE MANUFACTURED BY USING THE SAME

(71) Applicant: HANKOOK TIRE CO., LTD., Seoul (KR)

(72) Inventors: Ji Eun Choi, Daejeon (KR); Ho Youn Kang, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 38 days.

(21) Appl. No.: 14/103,824

(22) Filed: Dec. 11, 2013

(65) Prior Publication Data

US 2014/0171577 A1 Jun. 19, 2014

(30) Foreign Application Priority Data

Dec. 14, 2012 (KR) ........................ 10-2012-0146319

(51) Int. Cl.
*C08L 9/06* (2006.01)
*C08K 3/36* (2006.01)
*B60C 1/00* (2006.01)
*C08L 9/02* (2006.01)

(52) U.S. Cl.
CPC ................. *C08L 9/06* (2013.01); *B60C 1/0016* (2013.04); *C08K 3/36* (2013.01); *C08L 9/02* (2013.01)

(58) Field of Classification Search
CPC ............ B60C 1/0016; C08K 3/36; C08L 9/06
USPC ....................................................... 524/493
See application file for complete search history.

(56) References Cited

U.S. PATENT DOCUMENTS

| | | |
|---|---|---|
| 5,227,425 A | 7/1993 | Rauline |
| 2002/0143096 A1 | 10/2002 | Amaddeo et al. |
| 2004/0220315 A1 | 11/2004 | Robert et al. |
| 2007/0203274 A1 | 8/2007 | Korth et al. |
| 2009/0018238 A1 | 1/2009 | Yanagisawa et al. |
| 2010/0190885 A1 | 7/2010 | Hua et al. |
| 2012/0041129 A1 | 2/2012 | Steinhauser et al. |
| 2012/0247630 A1 | 10/2012 | Moreland |

FOREIGN PATENT DOCUMENTS

| | | |
|---|---|---|
| JP | S57087443 A | 5/1982 |
| JP | H07196850 A | 8/1995 |
| JP | H11181157 A | 7/1999 |
| JP | 2008525545 A | 7/2008 |
| KR | 20010106737 A | 12/2001 |
| KR | 100762207 B1 | 10/2007 |
| KR | 20110071607 A | 6/2011 |
| KR | 20120014449 A | 2/2012 |
| KR | 20120057079 A | 6/2012 |
| WO | 2006066922 A2 | 6/2006 |

OTHER PUBLICATIONS

KR 10-2011-0071607 A (2011), machine translation, KIPO Korean Intellectual Property Rights Information Service (KIPRIS).*
KR 10-2012-0014449 A (2012), machine translation, KIPO Korean Intellectual Property Rights Information Service (KIPRIS).*
Extended European Search Report for EP13196074.2, mailed Apr. 30, 2014.

* cited by examiner

*Primary Examiner* — Susannah Chung
*Assistant Examiner* — Josephine Chang

(57) ABSTRACT

The rubber composition for tire tread and a tire includes 100 parts by weight of a raw material rubber that includes 20 parts by 80 parts by weight of a first solution polymerized styrene-butadiene rubber (SBR1) having a styrene content of 15% to 25% by weight and a vinyl content in the butadiene of 60% to 65% by weight and produced by a batch method; and 60 parts to 90 parts by weight of a silica having a specific surface area measured by nitrogen adsorption of 155 $m^2/g$ to 185 $m^2/g$ and a CTAB value of 150 $m^2/g$ to 170 $m^2/g$.

5 Claims, No Drawings

RUBBER COMPOSITION FOR TIRE TREAD AND TIRE MANUFACTURED BY USING THE SAME

BACKGROUND OF THE INVENTION

1. Field of the Invention

The present invention relates to a rubber composition for tire tread and a tire produced using the same, and, more particularly, to a rubber composition for tire tread, which has excellent processability in an unvulcanized state and can enhance all of the braking performance on wet road surfaces, the braking performance on icy road surfaces, and the low fuel consumption performance, and a tire produced using the same.

2. Description of the Related Art

As a result of the recent performance enhancement of passenger vehicles, there is a demand from consumers for simultaneous performance enhancement of tires, and particularly, there is a demand for a tire exhibiting abrasion resistance, handling and ride performance, wet braking properties and low fuel consumption characteristics, all at a satisfactory level. Thus, application of an advanced concept material is being actively investigated.

Furthermore, regarding the tire technology for obtaining a tire exhibiting abrasion resistance, braking properties, handling and ride performance, and low fuel consumption characteristics all at the same time, development has been achieved to a large extent, especially in the field of material science.

In addition, during the operation of enhancing the performance, tire compositions have a characteristic that the processability of a compound is deteriorated, and for mass production of a compound, an increase in the compound processability is needed.

Generally, as a technology for reducing the rotational resistance that is related to the fuel consumption performance of tires, it has been attempted to decrease the rotational resistance by reducing the amount of a reinforcing filler to reduce the interaction between the molecules of the reinforcing agent, and thereby decreasing the hysteresis loss.

However, this technology has a disadvantage that as the amount of the reinforcing filler is decreased, the braking performance on wet road surfaces and steering stability performance, which are important characteristics of a tire tread, are deteriorated.

As such, generally, when the fuel consumption performance of a tire is enhanced in the current technology level of tire material development, the braking performance on wet road surfaces may be rather deteriorated, and when the braking performance of a tire on wet road surfaces is enhanced, the low fuel consumption performance may become disadvantageous.

In regard to the various performances of tires, since tires exhibit a phenomenon in which when one performance is enhanced, another performance is deteriorated, there is a demand for the development of a technology which can enhance one performance while minimizing deterioration of another performance, or can even enhance two performances at the same time, and in addition to this, there is also a demand for the development of a compound processing technology for mass production and a technology for enhancing the processability of the compound itself.

SUMMARY OF THE INVENTION

An object of the present invention is to provide a rubber composition for tire tread, which has excellent processability in an unvulcanized state and can enhance all of the braking performance on wet road surfaces, the braking performance on icy road surfaces and the low fuel consumption performance.

Another object of the present invention is to provide a tire produced using the rubber composition for tire tread described above.

According to one aspect of the present invention for the purpose of achieving the objects described above, there is provided a rubber composition for tire tread comprising 100 parts by weight of a raw material rubber that includes 20 parts to 80 parts by weight of a first solution polymerized styrene-butadiene rubber (SBR1) having a styrene content of 15% to 25% by weight and a vinyl content in the butadiene of 60% to 65% by weight and produced by a batch method; and 60 parts to 90 parts by weight of a silica having a specific surface area measured by nitrogen adsorption of 155 $m^2/g$ to 185 $m^2/g$ and a CTAB value of 150 $m^2/g$ to 170 $m^2/g$.

According to an embodiment of the invention, the raw material rubber may further include 10 parts to 40 parts by weight of a second solution polymerized styrene-butadiene rubber (SBR2) having a styrene content of 30% to 40% by weight and a vinyl content in the butadiene of 20% to 50% by weight and produced by a continuous method.

According to another embodiment of the invention, the raw material rubber may further include 10 parts to 60 parts by weight of butadiene rubber.

The first solution polymerized styrene-butadiene rubber may have the molecules coupled by silicon (Si) or tin (Sn), and may have the chain ends modified with hydrophilic groups.

According to another aspect of the present invention, there is provided a tire produced using the rubber composition for tire tread described above.

DETAILED DESCRIPTION OF THE PREFERRED EMBODIMENTS

Hereinafter the present invention will be described in more detail.

The rubber composition for tire tread according to an aspect of the present invention comprises 100 parts by weight of a raw material rubber that includes 20 parts to 80 parts by weight of a first solution polymerized styrene-butadiene rubber (SBR1) having a styrene content of 15% to 25% by weight and a vinyl content in the butadiene of 60% to 65% by weight and produced by a batch method; and 60 parts to 90 parts by weight of a silica having a specific surface area measured by nitrogen adsorption of 155 $m^2/g$ to 185 $m^2/g$ and a CTAB value of 150 $m^2/g$ to 170 $m^2/g$.

The solution polymerized styrene-butadiene rubber (S-SBR) can be generally produced by a continuous method and a batch method. A solution polymerized styrene-butadiene rubber produced by a continuous method has superior processability as compared with a solution polymerized styrene-butadiene rubber produced by a batch method; however, due to a large amount of low molecular weight substances, a large hysteresis loss occurs, and the low fuel consumption performance is inferior. On the other hand, a solution polymerized styrene-butadiene rubber produced by a batch method has a molecular weight distribution (MWD) of 1.3 to 1.5, showing a narrower molecular weight distribution compared to a continuous type styrene-butadiene rubber, and this is advantageous in view of the rotational resistance performance and the lower fuel consumption performance.

The rubber composition for tire tread described above uses, as the raw material rubber, a solution polymerized styrene-butadiene rubber produced by a batch method, in order to enhance the rotational resistance performance, and preferably uses 20 parts to 80 parts by weight of this solution polymerized styrene-butadiene rubber for the optimal rotational resistance performance. The solution polymerized styrene-butadiene rubber may have the molecules coupled with each other by means of tin (Sn), and may have the chain ends modified with hydrophilic groups. In regard to this, the respective molecules are linked through coupling, which decreases the number of chain ends of the molecules that are causative of the occurrence of hysteresis, and thus the low fuel consumption performance can be maximized. Furthermore, the hydrophilic groups at the chain ends have an advantage that the hydrophilic groups can increase the affinity between hydrophilic silica and hydrophobic rubber, thus enhancing the dispersion of silica, and can also enhance the properties of the rubber.

However, in the case of using a large amount of the batch type solution polymerized styrene-butadiene rubber, processability may be deteriorated as a result of the narrow molecular weight distribution. In order to complement this, the rubber composition for tire tread can have improved processability by further including 10 parts to 40 parts by weight of a continuous type solution polymerized styrene-butadiene rubber having excellent processability in the raw material rubber. The continuous type solution polymerized styrene-butadiene rubber is advantageous over the batch type solution polymerized styrene-butadiene rubber in view of processability as well as the braking performance on icy road surfaces. Thus, the continuous type solution polymerized styrene-butadiene rubber can enhance the abrasion performance of the compound as compared with the case of using a batch type solution polymerized styrene-butadiene rubber only.

Regarding the coupling agent for the batch type solution polymerized styrene-butadiene rubber, silicon (Si) or tin (Sn) may be used, and regarding the terminal modifying group, an alkoxysilane, a hydroxylamine or the like can be used.

Furthermore, the rubber composition for tire tread may further include a butadiene rubber as a raw material rubber. Regarding the butadiene rubber, any butadiene rubber used in a rubber composition for tire can be used.

The butadiene rubber can be included in an amount of 10 parts to 60 parts by weight. If the butadiene rubber is used in an amount of more than 60 parts by weight, the braking performance may be deteriorated because the proportion of the butadiene rubber having a relatively weak rubber strength is increased. If the butadiene rubber is used in an amount of less than 10 parts by weight, there may be a problem that the abrasion performance and the braking performance on icy road surfaces may be deteriorated.

Regarding the butadiene rubber, a butadiene rubber that does not contain oil can be preferably used. When the butadiene rubber does not contain oil, there is an effect that is advantageous in terms of the low fuel consumption characteristics and processability.

The rubber composition for tire tread contains silica as a reinforcing filler.

Regarding the silica, in order to obtain a rubber composition for tire tread that is suitable for the purpose of the present invention, it is preferable to use a silica having characteristics such as a specific surface area measured by nitrogen adsorption of 155 $m^2/g$ to 185 $m^2/g$ and a CTAB value of 150 $m^2/g$ to 170 $m^2/g$.

The silica can be used in an amount of 60 parts to 90 parts by weight relative to 100 parts by weight of the raw material rubber. If the content of silica is more than 90 parts by weight, the rotational resistance performance can be decreased, and if the content of silica is less than 60 parts by weight, the abrasion performance and braking performance may become inferior.

The rubber composition for tire tread may further include a coupling agent for an increase in dispersibility of the silica.

The coupling agent may be any one selected from the group consisting of a sulfide-based coupling agent, a mercapto-based coupling agent, a vinyl-based coupling agent, an amino-based coupling agent, a glycidoxy-based coupling agent, a nitro-based coupling agent, a chloro-based coupling agent, a methacryl-based coupling agent, and combinations thereof.

The sulfide-based coupling agent may be any one selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-trimethoxysilylpropyl methacrylate monosulfide, 3-trimethoxysilylpropyl methacrylate monosulfide, and combinations thereof.

The mercapto-based coupling agent may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane, and combinations thereof. The vinyl-based coupling agent may be any one selected from the group consisting of ethoxysilane, vinyltrimethoxysilane, and combinations thereof. The amino-based coupling agent may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane, and combinations thereof.

The glycidoxy-based coupling agent may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane, and combinations thereof. The nitro-based coupling agent may be any one selected from the group consisting of 3-nitropropyltrimethoxysilane, 3-nitropropyltriethoxysilane, and combinations thereof. The chloro-based coupling agent may be any one selected from the group consisting of 3-chloropropyltrimethoxysilane, 3-chloropropyltriethoxysilane, 2-chloroethyltrimethoxysilane, 2-chloroethyltriethoxysilane, and combinations thereof.

The methacryl-based silane compound may be any one selected from the group consisting of γ-methacryloxypropyltrimethoxysilane, γ-methacryloxypropylmethyldimethoxysilane, γ-methacryloxypropyldimethylmethoxysilane, and combinations thereof.

The coupling agent may be included in an amount of 5.5 parts to 9.0 parts by weight relative to 100 parts by weight of the raw material rubber. If the content of the coupling agent is less than 5.5 parts by weight, the reaction with silica may occur to an insufficient extent so that processability of the rubber may be decreased, or the low fuel consumption performance may be deteriorated. If the content is more than 9.0 parts by weight, the interaction between silica and the rubber may be so strong that the low fuel consumption performance may be excellent, but the braking performance may be seriously deteriorated.

The rubber composition for tire tread may optionally further include various additives such as a vulcanizing agent, a vulcanization accelerator, a vulcanization acceleration aid, an aging preventing agent, and a softening agent. Regarding the various additives, any additive may be used as long as it is an additive conventionally used in the art to which the present invention is pertained, and the contents of these additives comply with the mixing ratios used in conventional rubber compositions for tire tread and are not particularly limited.

As for the vulcanizing agent, a sulfur-based vulcanizing agent, an organic peroxide, a resin vulcanizing agent, or a metal oxide such as magnesium oxide can be used.

Examples of the sulfur-based vulcanizing agent that can be used include inorganic vulcanizing agents such as powdered sulfur (S), insoluble sulfur (S), precipitated sulfur (S) and colloidal sulfur; and organic vulcanizing agents such as tetramethylthiuram disulfide (TMTD), tetraethylthiuram disulfide (TETD) and dithiodimorpholine. As the sulfur vulcanizing agent, specifically elemental sulfur, or a vulcanizing agent generating sulfur, for example, amine disulfide or macromolecular sulfur can be used.

Regarding the organic peroxide, any one selected from the group consisting of benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexane, 1,3-bis(t-butylperoxypropyl)benzene, di-t-butylperoxy-diisopropylbenzene, t-butyperoxybenzene, 2,4-dichlorobenzoyl peroxide, 1,1-dibutylperoxy-3,3,5-trimethylsiloxane, n-butyl-4,4-di-t-butyl peroxyvalerate, and combinations thereof can be used.

The vulcanizing agent is preferably included in an amount of 0.5 parts to 2.5 parts by weight relative to 100 parts by weight of the raw material rubber, from the viewpoint that as an adequate vulcanization effect, the vulcanizing agent makes the raw material rubber less susceptible to heat and chemically stable.

The vulcanization accelerator means an accelerator that accelerates the rate of vulcanization or accelerates the delaying action in the initial vulcanization stage.

Regarding the vulcanization accelerator, any one selected from the group consisting of sulfenamide-based, thiazole-based, thiuram-based, thiourea-based, guanidine-based, dithiocarbamic acid-based, aldehyde-amine-based, aldehyde-ammonia-based, imidazoline-based and xanthate-based vulcanization accelerators, and combinations thereof can be used.

Regarding the sulfenamide-based vulcanization accelerator, for example, any one sulfonamide-based compound selected from the group consisting of N-cyclohexyl-2-benzothiazyl sulfenamide (CBS), N-tert-butyl-2-benzothiazyl sulfenamide (TBBS), N,N-dicyclohexyl-2-benzothiazyl sulfenamide, N-oxydiethylene-2-benzothiazyl sulfenamide, N,N-diisopropyl-2-benzothiazole sulfonamide, and combinations thereof can be used.

Regarding the thiazole-based vulcanization accelerator, for example, any one thiazole-based compound selected from the group consisting of 2-mercaptobenzothiazole (MBT), dibenzothiazyl disulfide (MBTS), sodium salt of 2-mercaptobenzothiazole, zinc salt of 2-mercaptobenzothiazole, copper salt of 2-mercaptobenzothiazole, cyclohexylamine salt of 2-mercaptobenzothiazole, 2-(2,4-dinitrophenyl)mercaptobenzothiazole, 2-(2,6-diethyl-4-morpholinothio)benzothiazole, and combinations thereof can be used.

Regarding the thiuram-based vulcanization accelerator, for example, any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide, and combinations thereof can be used.

Regarding the thiourea-based vulcanization accelerator, for example, any one thiourea-based compound selected from the group consisting of thiacarbamide, diethylthiourea, dibutylthiourea, trimethylthiourea, di-ortho-tolylthiourea, and combinations thereof can be used.

Regarding the guanidine-based vulcanization accelerator, for example, any one guanidine-based compound selected from the group consisting of diphenylguanidine, di-ortho-tolylguanidine, triphenylguanidine, ortho-tolylbiguanide, diphenylguanidine phthalate, and combinations thereof can be used.

Regarding the dithiocarbamic acid-based vulcanization accelerator, for example, any one dithiocarbamic acid-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and combinations thereof can be used.

Regarding the aldehyde-amine-based or aldehyde-ammonia-based vulcanization accelerator, for example, any one aldehyde-amine-based or aldehyde-ammonia-based compound selected from the group consisting of acetaldehyde-aniline reaction product, butyl aldehyde-aniline condensate, hexamethylenetetramine, acetaldehyde-ammonia reaction product, and combinations thereof can be used.

Regarding the imidazoline-based vulcanization accelerator, for example, an imidazoline-based compound such as 2-mercaptoimidazoline can be used, and regarding the xanthate-based vulcanization accelerator, for example, a xanthate-based compound such as zinc dibutylxanthogenate can be used.

The vulcanization accelerator may be included in an amount of 0.5 parts to 3.5 parts by weight relative to 100 parts by weight of the raw material rubber, in order to maximize the increase of productivity through the acceleration of the vulcanization rate, and the enhancement of rubber properties.

The vulcanization acceleration aid is a blending agent used in combination with the vulcanization accelerator in order to make the accelerating effect fully effective, and any one selected from the group consisting of an inorganic vulcanization acceleration aid, an organic vulcanization acceleration aid, and combinations thereof can be used.

Regarding the inorganic vulcanization acceleration aid, any one selected from the group consisting of zinc oxide (ZnO), zinc carbonate, magnesium oxide (MgO), lead oxide, potassium hydroxide, and combinations thereof can be used. Regarding the organic vulcanization acceleration aid, any one selected from the group consisting of stearic acid, zinc stearate, palmitic acid, linoleic acid, oleic acid, lauric acid, dibutylammonium oleate, derivatives thereof, and combinations thereof can be used.

Particularly, zinc oxide and stearic acid can be used together as the vulcanization acceleration aids, and in this case, zinc oxide dissolves in stearic acid and forms an effective complex with the vulcanization accelerator. Then, the complex produces free sulfur during a vulcanization reaction, and thereby facilitates a crosslinking reaction of rubber.

When zinc oxide and stearic acid are used together, these compounds can be used in amounts of 1 part to 5 parts by weight and 0.5 parts to 3 parts by weight, respectively, relative to 100 parts by weight of the raw material rubber in order to take the role as appropriate vulcanization acceleration aids.

The rubber composition for tire tread has excellent processability and thus may not contain a softening agent at the time of rubber incorporation; however, the rubber composition may contain a softening agent that is conventionally used in rubber for tires.

The softening agent can be added to the rubber composition in order to facilitate processing by imparting plasticity to rubber, or to decrease the hardness of vulcanized rubber. Regarding the softening agent, any one selected from the group consisting of process oil, plant oils and fats, and combinations thereof can be used, but the present invention is not intended to be limited thereto.

Regarding the process oil, any one selected from the group consisting of paraffin-based process oils, naphthene-based process oils, aromatic process oils, and combinations thereof can be used.

However, along with a buildup of the environmental awareness, it is known that when the content of polycyclic aromatic hydrocarbons (hereinafter, referred to as "PAHs") that are contained in the aromatic process oils is 3% by weight or more, the aromatic process oils have a high possibility of carcinogenesis. Therefore, for the process oil that is used as a softening agent, a process oil having a total content of PAH components of 3% by weight or less relative to the total amount of the process oil, a dynamic viscosity of 95° C. or higher (210° F. SUS), and a composition ratio of 15% to 30% by weight of aromatic components, 27% to 37% by weight of naphthene-based components, and 38% to 58% by weight of paraffin-based components in the softening agent, can be preferably used.

The process oil makes the low temperature characteristics of the tire tread containing the process oil and the fuel consumption performance excellent, and also has advantageous characteristics in terms of environmental factors such as the possibility of carcinogenesis of PAHs.

Regarding the plant oils and fats, any one selected from the group consisting of castor oil, cotton seed oil, flaxseed oil, canola oil, soybean oil, palm oil, coconut oil, peanut oil, pine oil, pine tar, tall oil, corn oil, rice bran oil, rapeseed oil, sesame oil, olive oil, sunflower oil, palm kernel oil, camellia oil, jojoba oil, macadamia nut oil, safflower oil, tung oil, and combinations thereof can be used.

The softening agent is preferably used in an amount of 20 parts to 40 parts by weight relative to 100 parts by weight of the raw material rubber, from the viewpoint of making the processability of the raw material rubber satisfactory.

The aging preventing agent is an additive used to stop the chain reaction causing spontaneous oxidation of the tire by oxygen. Regarding the aging preventing agent, any one selected from the group consisting of amine-based, phenol-based and imidazole-based agents, carbamic acid metal salts, and combinations thereof can be appropriately selected and used.

Regarding the aging preventing agent, any one compound selected from the group consisting of N-(1,3-dimethylbutyl)-N-phenyl-p-phenylenediamine (6PPD), N-phenyl-n-isopropyl-p-phenylenediamine (3PPD), poly(2,2,4-trimethyl-1,2-dihydroquinoline (RD), and combinations thereof can be preferably used.

In consideration of the condition that the aging preventing agent should have high solubility for rubber in addition to the aging preventing action, should also be less volatile and inert to rubber, and should not inhibit vulcanization, the aging preventing agent may be included in an amount of 1 part to 10 parts by weight relative to 100 parts by weight of the raw material rubber.

The rubber composition for tire tread includes: 1) 20 parts to 80 parts by weight of a first solution polymerized styrene-butadiene rubber (SBR1) having a styrene content of 15% to 25% by weight, a vinyl content in the butadiene of 60% to 65% by weight and produced by a batch method; 2) 10 parts to 40 parts by weight of a second solution polymerized styrene-butadiene rubber (SBR2) having a styrene content of 30% to 40% by weight and a vinyl content in the butadiene of 20% to 50% by weight and produced by a continuous method; 3) 10 parts to 60 parts by weight of a butadiene rubber; and 4) 60 parts to 90 parts by weight of a silica having a specific surface area measured by nitrogen adsorption of 155 $m^2/g$ to 185 $m^2/g$ and a CTAB value of 150 $m^2/g$ to 170 $m^2/g$ as a reinforcing agent, and 5) the batch type solution polymerized styrene-butadiene rubber may have the molecules coupled by means of silicon (Si) or tin (Sn) and may have the chain ends modified by hydrophilic groups.

The rubber composition for tire tread having the configuration described above exhibits excellent processability in an unvulcanized state, and can improve all of the braking performance on wet road surfaces, the braking performance on icy road surfaces, and the low fuel consumption performance.

The rubber composition for tire tread can be used for all-season purposes, but can be preferably used for summer use. The rubber composition for tire tread has an effect that is advantageous as a tire tread rubber composition for summer optimized for fuel consumption, braking on wet road surfaces, and steering performance upon high speed driving, which are the main required performances of tire tread for summer, rather than the braking performance on icy road surfaces or the abrasion performance required from tire tread for all-season purpose, by reinforcing the low fuel consumption performance and simultaneously maintaining the braking performance and steering performance.

The rubber composition for tire tread can be prepared by a conventional two-stage continuous preparation process. That is, the rubber composition can be prepared in an appropriate mixer using a first stage of subjecting the rubber composition to a thermomechenical treatment or kneading at a maximum temperature of 110° C. to 190° C., preferably at a high temperature of 130° C. to 180° C.; and a second stage of mechanically treating the rubber composition at a low temperature of typically below 110° C., for example, 40° C. to 100° C., during the finishing stage in which the crosslinked system is mixed. However, the present invention is not intended to be limited to this.

The rubber composition for tire tread is not limited to the tread (tread cap and tread base), and can be incorporated into various rubber constituent elements that constitute the tire. Examples of the rubber constituent elements include side wall, sidewall insertions, apex, chafer, wire coat, and inner liner.

The tire according to another aspect of the present invention is produced using the rubber composition for tire tread described above. Regarding the method for producing a tire using the rubber composition for tire tread, any method that is used in conventional tire production can be applied, and therefore, further detailed description will not be given in the present specification.

The tire may be a tire for passenger vehicles, a tire for racing cars, an aircraft tire, a tire for agricultural machines, a tire for offroad driving, a truck tire, a bus tire, or the like. Also, the tire may be a radial tire or a bias tire, and is preferably a radial tire.

The rubber composition for tire tread of the present invention has excellent processability in an unvulcanized state, and can improve all of the braking performance on wet road surfaces, the braking performance on icy road surfaces, and the low fuel consumption performance.

EXAMPLES

Hereinafter, Examples of the present invention will be described in detail so that those having ordinary skill in the art can easily carry out the present invention. However, the present invention can be realized in various different forms, and is not intended to be limited to the Examples described herein.

Preparation Example

Preparation of Rubber Composition

Rubber compositions for tire tread according to the Examples and Comparative Examples described below were prepared using the compositions presented in the following Table 1. Preparation of the rubber compositions was carried out in accordance with a conventional method for preparing a rubber composition.

TABLE 1

(unit: parts by weight)

|  | Comparative Example 1 | Comparative Example 2 | Example 1 | Example 2 | Example 3 | Example 4 | Example 5 | Example 6 |
|---|---|---|---|---|---|---|---|---|
| S-SBR[1] | 80 | — | 80 | 60 | 30 | 20 | 40 | 40 |
| S-SBR[2] | — | 80 | — | — | 30 | 40 | 20 | 20 |
| BR[3] | 20 | 20 | 20 | 40 | 40 | 40 | 40 | 40 |
| Silica[4] | 80 | 80 | — | — | — | — | — | — |
| Silica[5] | — | — | 80 | 80 | 80 | 80 | 80 | 70 |
| Coupling agent[6] | 6.4 | 6.4 | 6.4 | 6.4 | 6.4 | 6.4 | 6.4 | 5.6 |
| Zinc oxide | 3 | 3 | 3 | 3 | 3 | 3 | 3 | 3 |
| Stearic acid | 1 | 1 | 1 | 1 | 1 | 1 | 1 | 1 |
| Sulfur | 1.75 | 1.75 | 1.75 | 1.75 | 1.75 | 1.75 | 1.75 | 1.75 |
| Accelerator[7] | 1 | 1 | 1 | 1 | 1 | 1 | 1 | 1 |
| Accelerator[8] | 2 | 2 | 2 | 2 | 2 | 2 | 2 | 2 |

[1]S-SBR: Solution polymerized styrene-butadiene rubber (SBR) having a styrene content of 15% to 25% by weight and a vinyl content in the butadiene of 60% to 65% by weight and produced by a batch method, in which the molecules are coupled by means of silicon (Si), and the chain ends are modified with hydrophilic groups.
[2]S-SBR: Solution polymerized styrene-butadiene rubber (SBR) having a styrene content of 30% to 40% by weight and a vinyl content in the butadiene of 20% to 30% by weight and produced by a continuous method.
[3]BR: Butadiene rubber
[4]Silica: Precipitated silica having a nitrogen adsorption value of 160 m$^2$/g and a CTAB value of 190 m$^2$/g
[5]Silica: Precipitated silica having a nitrogen adsorption value of 170 m$^2$/g and a CTAB value of 160 m$^2$/g
[6]Coupling agent: Si69 (product by Degussa AG)
[7]Accelerator: CBS (N-cyclohexyl-2-benzothiazyl sulfonamide)
[8]Accelerator: DPG (diphenylguanidine)

Experiment Example

Measurement of Properties of Rubber Composition

For the rubber specimens prepared in the Examples and Comparative Examples described above, the rubber properties were measured, and the results are presented in the following Table 2.

TABLE 2

|  | Comparative Example 1 | Comparative Example 2 | Example 1 | Example 2 | Example 3 | Example 4 | Example 5 | Example 6 |
|---|---|---|---|---|---|---|---|---|
| Mooney viscosity | 76 | 70 | 74 | 70 | 62 | 57 | 64 | 66 |
| Hardness | 73 | 72 | 70 | 69 | 68 | 67 | 70 | 68 |
| 300% Modulus | 15.8 | 10.7 | 14.3 | 11.2 | 13.2 | 12.5 | 14.4 | 13.6 |
| Elongation | 372 | 489 | 403 | 435 | 409 | 437 | 398 | 421 |
| Glass transition temperature | −62.2 | −56.7 | −62.2 | −64.8 | −59.8 | −58.3 | −61.9 | −61.3 |
| 0° C. tanδ | 0.257 | 0.274 | 0.231 | 0.202 | 0.208 | 0.226 | 0.217 | 0.203 |
| 60° C. tanδ | 0.158 | 0.171 | 0.147 | 0.123 | 0.131 | 0.142 | 0.125 | 0.110 |

The Mooney viscosity (ML1+4 (125° C.)) was measured according to ASTM D1646.

The hardness (Shore A) was measured according to DIN 53505.

The 300% modulus (Mpa) and the elongation (%) were measured according to ISO 37. The elongation means elongation at breakage, and was measured by a method of expressing the strain value until the specimen ruptured in a tensile tester, in percentage (%).

The glass transition temperature (° C.) was measured using a DSC method.

For the viscoelasticity, tan δ was measured using an RDS analyzer, under 0.5% strain from −60° C. to 80° C. at a frequency of 10 Hz.

In the above Table 2, the Mooney viscosity is a value representing the viscosity of unvulcanized rubber, and a smaller value indicates superior processability of unvulcanized rubber. 0° C. tan δ represents the braking performance, and a larger value indicates superior braking performance. 60° C. tan δ represents the rotational resistance characteristics, and a smaller value indicates superior performance. The hardness represents steering stability, and a larger value indicates superior steering stability performance. Regarding the 300% modulus and elongation, larger values indicate superior tensile characteristics, and a smaller value of the glass transition temperature indicates superior braking performance on icy road surfaces.

According to the above Table 2, in the case of Examples 1 to 5 that used the solution polymerized styrene-butadiene rubber produced by a batch method of the present invention and a solution polymerized styrene-butadiene rubber produced by a continuous method, the LRR performance and the braking performance were improved as compared with Comparative Examples 1 and 2 that used the rubber of the present invention alone, and particularly in the case of Examples 4 and 5, excellent rotational resistance performance and high wet grip performance were exhibited.

Preferred embodiments of the present invention have been described in detail above, but the scope of rights of the present invention is not intended to be limited thereto, and various modifications and improvements made by those skilled in the art using the basic concept of the present invention as defined in the following claims are also included in the scope of rights of the present invention.

What is claimed is:

1. A rubber composition for tire tread, comprising:
   100 parts by weight of a raw material rubber that includes 40 parts to 80 parts by weight of a first solution polymerized styrene-butadiene rubber (SBR1) having a styrene content of 15% to 25% by weight and a vinyl content in the butadiene of 60% to 65% by weight and produced by a batch method;
   10 parts to 20 parts by weight of a second solution polymerized styrene-butadiene rubber (SBR2) having a styrene content of more than 30% by weight and less than or equal to 40% by weight and a vinyl content in the butadiene of more than or equal to 20% by weight and less than 30% by weight and produced by a continuous method,
   10 parts to 60 parts by weight of butadiene rubber; and
   60 parts to 90 parts by weight of a silica having a specific surface area measured by nitrogen adsorption of 155 $m^2/g$ to 185 $m^2/g$ and a CTAB value of 150 $m^2/g$ to 170 $m^2/g$,
   wherein the first solution polymerized styrene-butadiene rubber includes molecules coupled by silicon (Si) and has the chain ends modified with hydrophilic groups.

2. A tire produced using the rubber composition for tire tread according to claim 1.

3. A rubber composition for tire tread, comprising:
   100 parts by weight of a raw material rubber that includes 40 parts to 80 parts by weight of a first solution polymerized styrene-butadiene rubber (SBR1) having a styrene content of 15% to 25% by weight and a vinyl content in the butadiene of 60% to 65% by weight and produced by a batch method, wherein the first solution polymerized styrene-butadiene rubber produced by the batch method has a molecular weight distribution of about 1.3 to about 1.5;
   10 parts to 20 parts by weight of a second solution polymerized styrene-butadiene rubber (SBR2) having a styrene content of more than 30% by weight and less than or equal to 40% by weight and a vinyl content in the butadiene of more than or equal to 20% by weight and less than 30% by weight and produced by a continuous method, wherein the second solution polymerized styrene-butadiene rubber produced by the continuous method has a molecular weight distribution different from that of the first solution polymerized styrene-butadiene rubber,
   10 parts to 60 parts by weight of butadiene rubber; and
   60 parts to 90 parts by weight of a silica having a specific surface area measured by nitrogen adsorption of 155 $m^2/g$ to 185 $m^2/g$ and a CTAB value of 150 $m^2/g$ to 170 $m^2/g$,
   wherein the first solution polymerized styrene-butadiene rubber includes molecules coupled by silicon (Si) and has the chain ends modified with hydrophilic groups.

4. The rubber composition for tire tread according to claim 3, wherein the second solution polymerized styrene-butadiene rubber has the molecular weight distribution broader than that of the first solution polymerized styrene-butadiene rubber.

5. A tire produced using the rubber composition for tire tread according to claim 3.

* * * * *